United States Patent
Stedman

[11] 3,922,030
[45] Nov. 25, 1975

[54] PROTECTIVE SEAT

[75] Inventor: Robert N. Stedman, Chillicothe, Ill.

[73] Assignee: Caterpillar Tractor Co., Peoria, Ill.

[22] Filed: June 24, 1974

[21] Appl. No.: 482,510

[52] U.S. Cl. .............. 296/65 A; 267/131; 297/216
[51] Int. Cl.² .......................................... B60N 1/02
[58] Field of Search .......... 297/216, 349, 353, 385,
297/285, 452; 248/399, 400; 267/131;
296/65 R, 65 A, 63, 35 B

[56] References Cited
UNITED STATES PATENTS

| | | | |
|---|---|---|---|
| 3,191,400 | 6/1965 | Swenson | 296/65 R |
| 3,236,556 | 2/1966 | Lathers | 296/65 R |
| 3,291,527 | 12/1966 | Hall et al. | 297/353 |
| 3,730,588 | 5/1973 | Braun | 297/452 |
| 3,792,896 | 2/1974 | Eggert, Jr. | 248/399 |

Primary Examiner—Robert J. Spar
Assistant Examiner—Lawrence J. Oresky
Attorney, Agent, or Firm—Phillips, Moore, Weissenberger, Lempio & Strabala

[57] ABSTRACT

The invention provides a vehicle safety seat particularly applicable to the relative exposed operator cabs of earthmoving vehicles. The seat includes angularly disposed resilient members for improved absorption of shock from both vertical and horizontal loading, and an improved adjustable shoulder support assembly having variably resilient wing portions. The safety seat further includes structure for permitting a desired degree of freedom of movement of the operator or other occupant, which means includes operator-controlled structure for rotating the seat about a central vertical axis.

16 Claims, 2 Drawing Figures

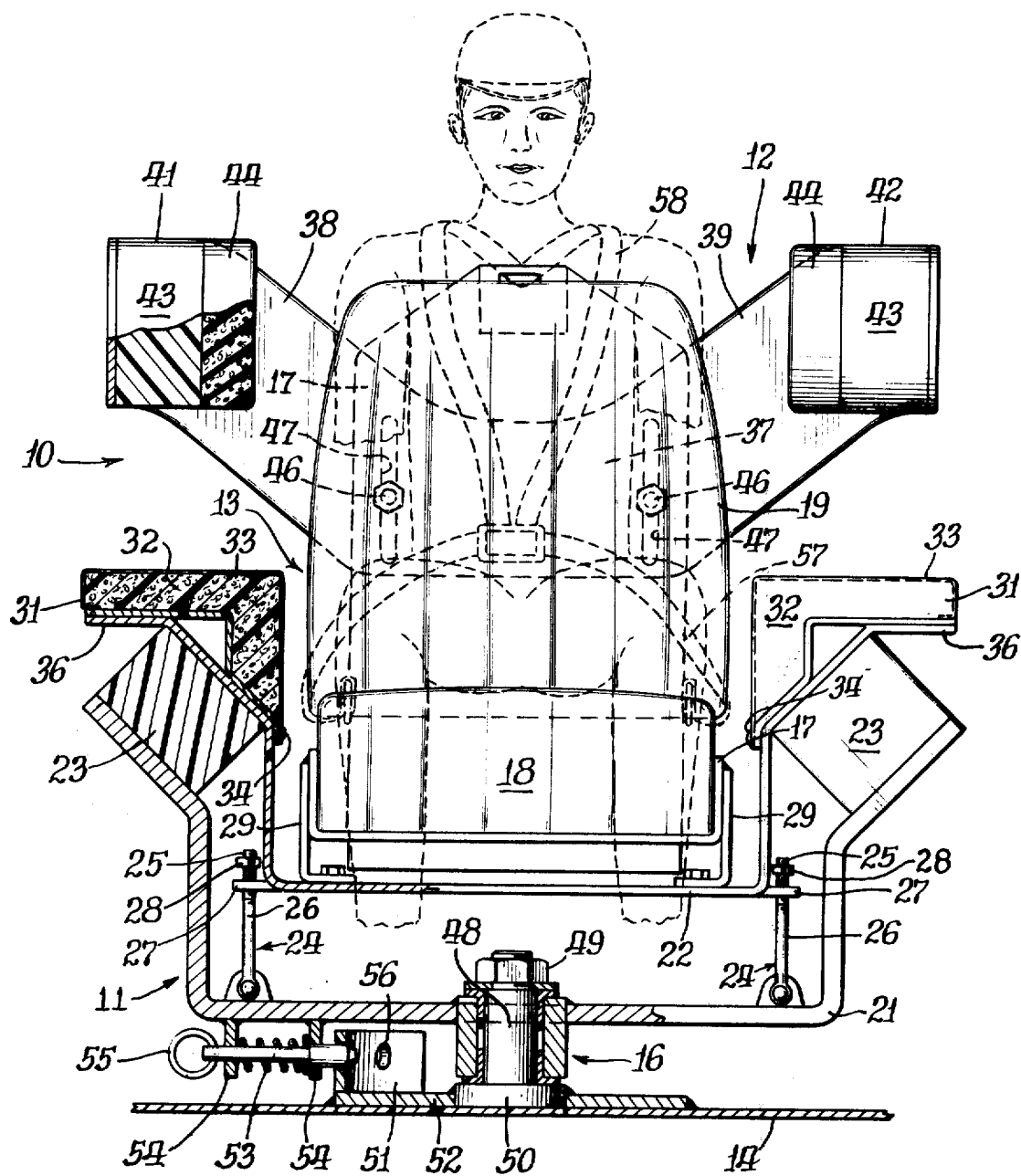

PROTECTIVE SEAT

BACKGROUND OF THE INVENTION

This invention relates to vehicle safety seats. In particular this invention relates to a protective, shock-absorbing safety seat for vehicles used in the earthmoving industry which vehicles often afford little or no protection to the occupants thereof.

Many types of vehicle safety seats have been previously proposed which are designed to protect vehicle occupants and retstrain them against the influence of high accelerational forces developed during accidents, emergency maneuvers and similar occurrences. Many such seats, exemplified by those described in U.S. Pat. No. 2,777,531 to Erickson and in SAE JOURNAL, March 1968, at pp. 56–60, incorporate a variety of restraints, typically in conjunction with impact-absorbing elements. These prior art seats, however, are primarily directed to use in conventional vehicles which vehicles enclose the occupants thereof and afford protection of themselves in the event of an accident, particularly of the type which results in vehicle roll-over. Additionally, such conventional vehicle safety seats are generally designed to accommodate only occupant activity which is typically encountered in the particular type of vehicle. Such occupant activity under normal circumstances in enclosed-type vehicles is usually relatively minimal, and extensive restraints can be provided without interfering with the normal movements of driver or passengers.

Incorporation of such prior art safety seats are in vehicles which do not provide customary occupant protection, such as operator cabs of earthworking equipment, is, therefore, frequently ineffective in preventing occupant injury, particularly in vehicle roll-over situations. Also, the restraining systems frequently employed in combination with these seats typically interfere with the movements of the operator of such equipment, who must be permitted free access to all parts of the operator console and control elements in order to manipulate various functions of the equipment.

It is, therefore, desirable to provide an efficient safety seat for particular use on earthworking vehicles or similar equipment where the occupant is relatively exposed, and which also provides adequate freedom of movement for the occupant; especially for the operation of rear-mounted attachments on earthworking equipment, or for similar requirements.

SUMMARY AND OBJECTS OF THE INVENTION

The invention provides a vehicle safety seat comprising improved suspension means including angularly disposed resilient members for absorbing vertically downward and horizontal loads, and damping recoil, and improved shoulder and arm support means for absorbing horizontal loads generated for example, by sideward motion occurring during a side roll-over of the vehicle. The safety seat further includes an assembly of steel or other strong material which may conveniently comprise a modified standard production seat secured to the suspension means and shoulder support means. The safety seat further comprises rotation means and preferably fore-and-aft displacement means for maximum seat adjustment according to the occupant's needs.

It is an object of this invention to provide a vehicle safety seat for protecting the occupant thereof against the effects of high vertical and lateral acceleration forces.

It is another object of this invention to provide a vehicle safety seat for use in conjunction with earthworking vehicles having improved means for protecting the occupant thereof in the event of a side roll-over of the vehicle.

It is another object of this invention to provide a vehicle safety seat which permits extensive freedom of movement to the occupant thereof.

It is an additional object of this invention to provide a vehicle safety seat for an earthworking vehicle which permits the occupant thereof full access to the vehicle controls and full visibility of vehicle attachments, including rear mounted attachments.

It is yet another object of this invention to provide a vehicle safety seat having improved suspension and lateral support means.

Other objects and advantages of the invention will become apparent from the following description and drawings.

BRIEF DESCRIPTION OF THE DRAWINGS

FIG. 2 is a front view of the safety seat of FIG. 1.

DETAILED DESCRIPTION

Figure 1:
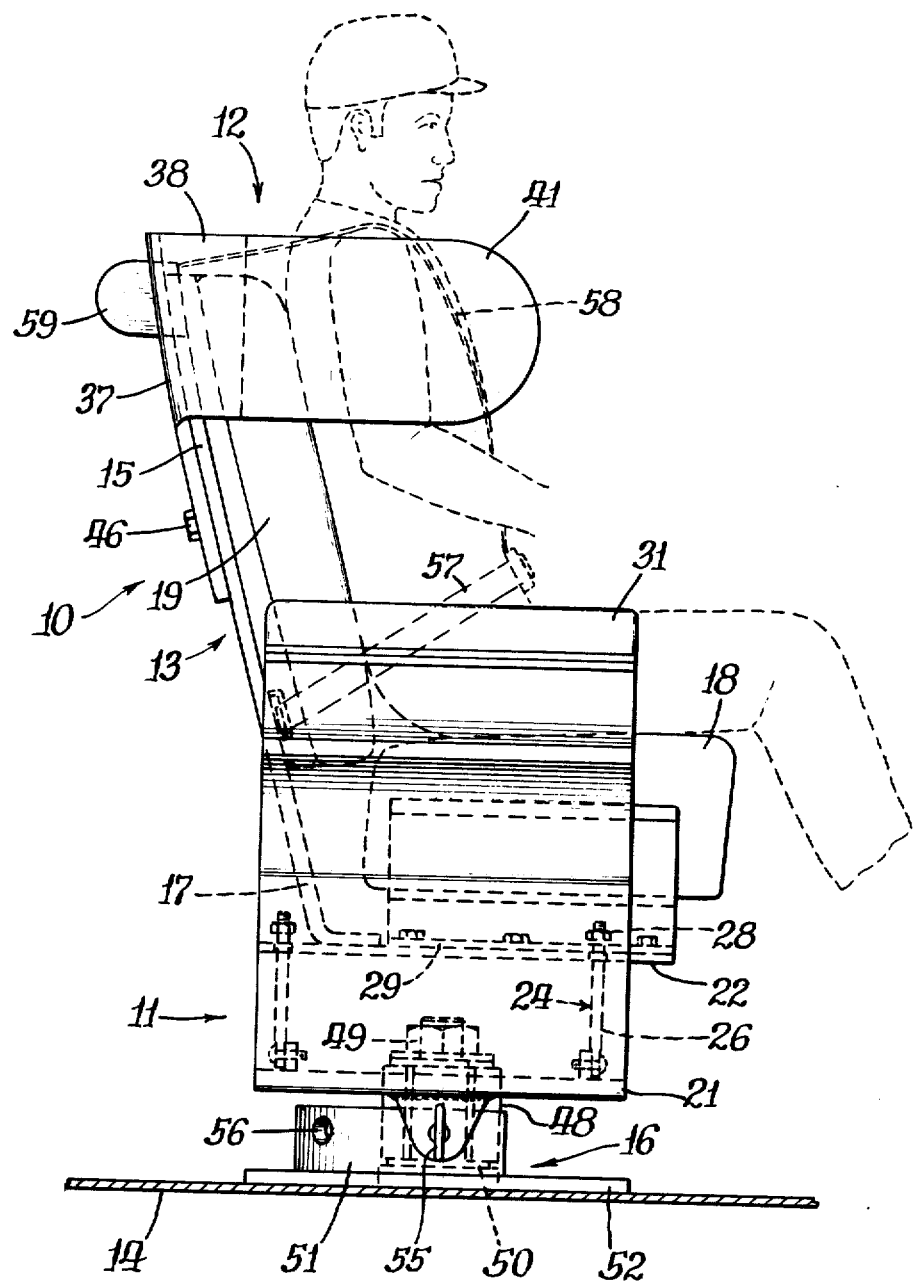
FIG. 1 is an elevation of the safety seat of this invention shown attached to a vehicle frame and with an occupant in position.

FIGS. 1 and 2 illustrate the safety seat of this invention generally indicated at 10. Suspension means are indicated generally at 11, a shoulder support assembly is generally indicated at 12, and a seat assembly is generally indicated at 13. The seat 10 is shown mounted upon the floorboard 14 of a vehicle (not shown) by mounting and rotation means generally indicated at 16 for permitting rotation of the seat 10 approximately 45° about a vertical axis.

The seat assembly 13 includes a rigid seat frame 17 with an adjustable back portion 15 and a seat cushion 18 and back cushion 19 for occupant comfort. The seat assembly 13 is mounted by means of the suspension means 11 of this invention, which means include a rigid base plate member 21, a parallel disposed rigid upper plate member 22, and a resilient means 23 disposed between the base plate member 21 and the upper plate member 22. Portions of the plate members 21 and 22 are horizontally disposed in planes parallel to the floorboard 14 beneath the seat assembly 13, other adjacent portions extend vertically to the point at which the upper plate member 22 is approximately level with the upper surface of the seat cushion 18, and then other portions diverge outwardly at an angle with the vertical portions. The resilient means 23 are thus angularly disposed with respect to the normal vertical attitude of the seat occupant in the vicinity of the occupant's hips and thighs and capable of absorbing the vertical and horizontal loading which would be exerted by the occupant during a vehicle side roll-over and damping the return forces.

The suspension means 11 further include a plurality of hold-down means 24 each comprising a retaining member such as a rod or dowel 26 pivotally secured at one end thereof to the base plate member 21 and to the other end thereof to the upper plate member 22 for permitting vertical downward and lateral movement of the seat assembly 13 while limiting vertical upward movement thereof. The dowel members each include a threaded upper portion 25 and are secured to the upper plate member 22 by disposing the upper threaded portion 25 thereof through a yoke 27 attached to the upper plate member and threadably securing a nut 28 thereupon to permit an adjustably limited upward movement of the upper plate member.

The seat assembly 13 is secured to the suspension means 11 by means of a plurality of L-shaped brackets 29 and suitable fastening means. Preferably, the suspension means 11 further include right and left L-shaped arm rests 31 which further absorb loading and provide horizontal surfaces upon which the occupant may comfortably and conveniently place his arms. The arm rests 31 each comprise a resilient L-shaped foam member 32 covered and supported by an encasement means 33 which is secured to the upper plate member 22 by a plurality of bolts 34 so that the longer leg of the L configuration presents a horizontal resting surface for the occupant's arm. Extension members 36 are provided on the upper plate member 22 to further support each of the arm rests 31.

The shoulder support assembly 12 of the seat 10 is designed to provide comfortable working support for the seat occupant and to provide a protective partial enclosure particularly effective in protecting the occupant from injuries due to lateral loading generated during a side-to-side vehicle roll-over. The support assembly 12 includes a back portion 37, right and left side-wing portions 38 and 39, and right and left forward wing portions 41 and 42 adjacent the shoulders and arms of the occupant of the seat 10. The back portion 37 and right and left side-wing portions 38 and 39 are formed of a suitably resilient material such as steel, while the right and left forward wing portions 41 and 42 are preferably comprised of a first resilient layer 43 of foam material or the like to absorb and dampen loads and a second resilient layer 44 somewhat less pliant than the first resilient layer 43 so that the forward wing portions are relatively less stiff than the side-wing portions 38 and 39 and thus afford increased cushioning against the lateral loads occasioned during a vehicle side roll-over or similar occurrences.

The resilient portions of the seat 10 may be comprised of polyurethane foam or other suitable deformable and supportive material. The shoulder support assembly 12 is adjustably secured to the seat 10 by means of a pair of bolts 46 threadably securable to the seat frame back 15. The support assembly 12 includes a pair of vertical slots 47 in the back portions 37 thereof through each of which one of the bolts 46 is inserted prior to securement in the seat frame back 15. The support assembly 12 may thus be adjusted to the desired height so that it is comfortable and does not interfere with the rearward vision of the occupant.

The mounting and rotation means 16 for rotating the seat 10 are particularly useful where the seat 10 is employed in an earthmoving vehicle which is equipped with rear-mounted attachments. In such an application, the rotation means 10 provides the operator ready access to the rear of the vehicle cab for operation of the rear mounted attachments.

The rotation means 16 includes a pivot shaft 48 secured at one end thereof at approximately the center of the base plate member 21 by a nut 49 or the like. The shaft is secured at the other end thereof to the vehicle floorboard 14 by means of a collar 50 which permits relative rotation between the pivot shaft 48 and the floorboard 14. The rotation means 16 further includes a curved vertically disposed plate 51 coaxial with the collar means 50 and secured thereto, as by a horizontal plate 52. Rotation of the seat 10 about the pivot shaft 48 with respect to the curved vertical plate 51 is controlled by stop means comprising a spring-biased pin 53 secured to the underside of the base plate member 21 by means of a pair of brackets 54. The pin 53 is receivable within any one of a series of angularly spaced apertures 56 formed in the curved vertical plate 51 and functions to hold the vertical plate against rotation when the pin 53 is disposed within one of the apertures 56. The action of the pin 53 is controlled by the occupant of the seat 10 by retraction means for retracting the pin 53 from the apertures 56 comprising a ring 55 or other conveniently operable device.

Additionally, the seat 10 may include positioning means for permitting fore-and-aft movement. Any convenient positioning means may be employed for this purpose such as a central groove (not shown) in the base plate member 21 for accomodating fore-and-aft sliding movement of the pivot shaft 48 and stop means (not shown) for restraining the seat 10 in the desired fore-to-aft position. Desirably, such positioning means could further include means for simultaneously raising the seat 10 as it is moved to an aft position, and lowering the seat 10 as it is moved to a fore position. The protective function of the seat 10 is further enhanced by means of a plurality of restraining belts, preferably comprising a lap belt 57 and a conventional shoulder assembly 58 including an inertia reel 59.

The seat 10, as described, has been shown in testing to be capable of accomodating a 200 lb. force at 15G vertical acceleration, and a 100 lb. force at 20G lateral acceleration. This represents high strength and shock-absorption capabilities and indicates that the present apparatus is sufficient to protect occupants in a much greater number of emergency situations than is now the case with prior art systems.

It may thus be seen that the safety seat of this invention provides increased occupant protection while permitting adequate freedom of movement. Although the invention has been described with respect to a particular embodiment, it is apparent that many other embodiments and modifications are possible within the purview of this invention and no limitations are intended except by the scope of the appended claims.

I claim:
1. A safety seat system for a vehicle having a mounting surface, said seat system including;
    suspension means for supporting a seating portion of said system and for absorbing shock loading transmitted to said seating portion, said suspension means including; first rigid base plate means, second rigid plate means for mounting said seating portion, first resilient element means disposed between said first and second rigid plate means for resiliently supporting said second plate means upon said first plate means, hold-down means connected between said first and second rigid plate means for limiting movement of said second plate means with respect to said first plate means in a direction normally away from said first plate means while permitting movement of said second plate means in lateral directions parallel to said first plate means, separate mounting means different from said first rigid plate means for mounting said first rigid plate means, said second rigid plate means and said seating portion upon said mounting surface for rotation with respect thereto.

2. The invention of claim 1 wherein said mounting means include means for rotating said seat system with respect to said mounting surface about a central pivot axis of said system, and further including locking means for locking said seat system in any of a plurality of angularly spaced rotative positions about said central pivot axis.

3. The invention of claim 2 wherein said mounting means include a central rigid support shaft fixedly attached to said mounting surface of said vehicle and bearing sleeve means for said shaft, said mounting means further including collar means fixedly connected to said first rigid plate means for rotatably engaging said bearing sleeve means for rotation relative thereto.

4. The invention of claim 2 wherein said locking means include a spring biased pin member attached to said first rigid base plate means and a perforate plate member fixed with respect to said mounting surface, said pin member adapted to engage any of a selected number of said perforations.

5. The invention of claim 1 wherein said seating portion includes shoulder support means for cushionably restraining an occupant of said seating portion at either side of said occupant.

6. The invention of claim 5 wherein said seating portion further includes first seat frame means attached to said second rigid plate means and extending away from said second plate means and from said mounting surface of said vehicle, said shoulder support means being adjustably mounted upon said first seat frame means by adjustment means.

7. The invention of claim 6 wherein said adjustment means include at least one longitudinally extending slot in one of said first seat frame means or said shoulder support means for coacting with a pin element slidably movable within said slot from one longitudinal and thereof to the other.

8. The invention of claim 6 wherein said seating portion further includes arm rest means mounted upon said first seat frame means for cushionably supporting the arms of an occupant of said safety seat system.

9. The invention of claim 8 wherein said arm rest means include resilient material padding means and protective covering means therefor.

10. The invention of claim 1 wherein said seating portion includes a seat cushion and a back cushion.

11. A safety seat system for a vehicle having a mounting surface, said seat system including;
suspension means for supporting a seating portion of said system and for absorbing shock loading transmitted to said seating portion, said suspension means including; first rigid base plate means, second rigid plate means for mounting said seating portion, first resilient element means disposed between said first and second rigid plate means for resiliently supporting said second plate means upon said first plate means, hold-down means connected between said first and second rigid plate means for limiting movement of said second plate means with respect to said first plate means in a direction normally away from said first plate means while permitting movement of said second plate means in lateral directions parallel to said first plate means, said first rigid base plate means including a modified U-shaped plate member having a first laterally extending surface, second and third surfaces extending substantially normally from said first surface, and fourth and fifth surfaces extending obliquely from said second and third surfaces respectively.

12. The invention of claim 11 wherein said second rigid plate means include another modified U-shaped plate member having laterally extending sixth surface disposed between said first surface and said seating portion, seventh and eighth surfaces extending substantially normally from said sixth surface, ninth and tenth surfaces extending obliquely from said seventh and eighth surfaces respectively in parallel disposition with respect to said fourth and fifth surfaces, and eleventh and twelfth surfaces extending laterally from said ninth and tenth surfaces in parallel relation to said first surface and said sixth surface.

13. The invention of claim 12 wherein said first resilient element means includes at least two separate resilient elements disposed respectively between said fourth and ninth surfaces and between said fifth and tenth surfaces.

14. The invention of claim 13 wherein said at least two resilient elements are composed of foam material.

15. The invention of claim 13 wherein said at least two resilient elements are composed of rubber material.

16. A safety seat system for a vehicle having a mounting surface, said seat system including;
suspension means for supporting a seating portion of said system and for absorbing shock loading transmitted to said seating portion, said suspension means including; first rigid base plate means, second rigid plate means for mounting said seating portion, first resilient element means disposed between said first and second rigid plate means for resiliently supporting said second plate means upon said first plate means, hold-down means connected between said first and second rigid plate means for limiting movement of said second plate means with respect to said first plate means in a direction normally away from said first plate means while permitting movement of said second plate means in lateral directions parallel to said first plate means, said hold-down means including a rod element pivotably mounted upon said first rigid base plate means, said hold-down means further including a first bracket fixedly connected to said second rigid plate means, said first bracket having first aperture means therein for slidably receiving a portion of said rod element, and limit stop means adjustably mounted upon said rod element for preventing the dislodgement of said rod element from said first aperture means, said first bracket being freely slidably movable upon said rod element between said limit stop means and the pivot connection of said rod element to said first rigid base plate means.

* * * * *